(12) United States Patent
Portes et al.

(10) Patent No.: US 10,409,563 B2
(45) Date of Patent: Sep. 10, 2019

(54) GENERATION OF APPLICATION CODES FROM A FORMAL SPECIFICATION

(71) Applicant: Airbus Operations (S.A.S.), Toulouse (FR)

(72) Inventors: Dominique Portes, Blagnac (FR); Victor Jegu, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 55 days.

(21) Appl. No.: 15/710,561

(22) Filed: Sep. 20, 2017

(65) Prior Publication Data

US 2018/0088913 A1    Mar. 29, 2018

(30) Foreign Application Priority Data

Sep. 26, 2016  (FR) ...................................... 16 59013

(51) Int. Cl.
| | | |
|---|---|---|
| *G06F 8/35* | (2018.01) | |
| *G06F 8/10* | (2018.01) | |
| *G06F 8/73* | (2018.01) | |
| *G06F 9/30* | (2018.01) | |
| *G06F 8/30* | (2018.01) | |
| *G06F 8/41* | (2018.01) | |

(Continued)

(52) U.S. Cl.
CPC ................. *G06F 8/35* (2013.01); *G06F 8/10* (2013.01); *G06F 8/37* (2013.01); *G06F 8/4434* (2013.01); *G06F 8/73* (2013.01); *G06F 9/30007* (2013.01); *G06F 9/30145* (2013.01); *G06F 9/45508* (2013.01)

(58) Field of Classification Search
CPC ..... G06F 8/10; G06F 8/35; G06F 8/37; G06F 8/73; G06F 8/4434; G06F 9/30007; G06F 9/30145; G06F 9/45508
USPC .......................................................... 717/106
See application file for complete search history.

(56) References Cited

U.S. PATENT DOCUMENTS 5,748,963 A * 5/1998 Orr ........................ G06F 9/4491
717/131
5,922,065 A * 7/1999 Hull .................... G06F 9/30072
712/203

(Continued)

OTHER PUBLICATIONS

Muller et al., "A Virtual Machine for Sensor Networks", ACM, 2007, 14pg. (Year: 2007).*

(Continued)

*Primary Examiner* — Ryan D. Coyer
(74) *Attorney, Agent, or Firm* — Jenkins, Wilson, Taylor & Hunt, P.A.

(57) ABSTRACT

System and method to generate automatically a compact application code suitable for taking advantage of the intrinsic power of processors. The system can generate the application code executable by a processor from a formal specification associated with an application, the formal specification including operators, and the system including an analyzer to code each operator of the formal specification by a corresponding operation code followed by a minimum number of input code(s) and output code identifying input and output parameters associated with the operator, thus automatically generating a compact application code suitable for being stored in a memory associated with the processor and for being executed by an interpreter of the processor.

12 Claims, 3 Drawing Sheets

(51) Int. Cl.
*G06F 9/455* (2018.01)
*G06F 9/44* (2018.01)

(56) References Cited

U.S. PATENT DOCUMENTS

| | | | | |
|---|---|---|---|---|
| 6,237,005 | B1* | 5/2001 | Griffin | G06F 9/5055 717/139 |
| 6,807,622 | B1* | 10/2004 | McGrath | G06F 9/30101 712/210 |
| 7,340,733 | B2* | 3/2008 | Archambault | G06F 8/4441 717/106 |
| 8,381,175 | B2* | 2/2013 | Chabbi | G06F 11/3604 717/106 |
| 2002/0112227 | A1* | 8/2002 | Kramskoy | G06F 8/4442 717/148 |
| 2003/0135842 | A1* | 7/2003 | Frey | G06F 8/71 717/121 |
| 2009/0013305 | A1* | 1/2009 | Clarke | G06F 8/10 717/104 |
| 2012/0265972 | A1* | 10/2012 | Zwartenkot | G06F 8/4434 712/226 |
| 2016/0274873 | A1* | 9/2016 | Fischer | G05B 19/0426 |

OTHER PUBLICATIONS

Antoy et al., "Automatically Checking an Implementation against Its Formal Specification", IEEE, 2000, 29pg. (Year: 2000).*
Hansen et al., "Model Selection and the Principle of Minimum Description Length", Journal of the American Statistical Association, 2001, 29pg. (Year: 2001).*
Hoogerbrugge et al., "A Code Compression System Based on Pipelined Interpreters", John Wiley & Sons, Ltd., 1999, 19pg. (Year: 1999).*
Joshi et al., "Denali: A Practical Algorithm for Generating Optimal Code", ACM, 2006, 23pg. (Year: 2006).*
Wurthinger et al., "One VM to Rule Them All", ACM, 2013, 18pg. (Year: 2013).*
Zaremski et al., "Specification Matching of Software Components", ACM, 1997, 37pg. (Year: 1997).*
Ertl, et al., "Vmgen—a generator of efficient virtual machine interpreters," Software—Practice and Experience, Wiley & Sons, Bognor Regis, GB, vol. 32, No. 3, pp. 265-294, XP001087296, ISSN: 0038-0644, DOI: 10.1002/spe.434, dated Mar. 1, 2002.
French Search Report for French Application No. 1659013 dated May 24, 2017.
Müller, et al., "A Virtual Machine for Sensor Networks," Operating Systems Review, ACM, New York, NY, US, vol. 41, No. 3, pp. 145-158, XP058271752, ISSN: 0163-5980, DOI:10.1145/1272998. 1273013, dated Mar. 21, 2007.
Varoumas, et al., "Concurrent Programming of Microcontrollers, a Virtual Machine Approach," Proc. of the 8th European Congress on Embedded Real Time Software and Systems (ERTS 2016), pp. 1-10, XP055375509, dated Jan. 1, 2016.
Piumarta, et al., "Optimizing direct threaded code by selective inlining," PLDI 09: Proc. of the 2009 ACM Sigplan Conference on Programming Language Design and Implementation, Jun. 15-20, 2009, Dublin, Ireland, [Sigplan Notices: A Monthly Publication of the Special Interest Group on Programming Languages . . . ], vol. 33, No. 5, pp. 291-300, XP000766278, DOI:10.1145/277652. 277743, ISBN: 978-1-60558-392-1, dated May 1, 1998.

* cited by examiner

GENERATION OF APPLICATION CODES FROM A FORMAL SPECIFICATION

CROSS-REFERENCE TO RELATED APPLICATION

This patent application claims priority to French patent application FR 16 59013, filed on Sep. 26, 2016, the entire disclosure of which is incorporated by reference herein.

TECHNICAL FIELD

The present disclosure relates to the field of generation of application codes executable by a processor from a formal specification associated with an application and, more particularly, relates to codes for application functions such as control, command, servo control, operational logic, etc.

Today, on-board application functions (particularly in aircraft) are typically specified in the form of SCADE boards which then allow the use of languages such as LUSTRE for automatically generating corresponding on-board codes. This type of language is normally based on a finite set of symbols which may be simple (for example a dual-input AND) or complex (for example a detection of changes of sign over a given period). The generation of the executable on-board code therefore comprises or consists in instantiating the series of symbols which is identified in the application specification.

Traditionally, a generation method is chosen which comprises or consists in taking each symbol each time that it must be executed. For example, if 10 AND symbols must be executed consecutively, the code produced will contain 10 times the binary code of the AND operation. This generation principle offers the advantage of being simple and provides an effective control of the code which will be executed by the computer, which is an important property for this type of certified software. In particular, the direct translation of the specification into a determined code is tested once and for all, thus significantly simplifying the checking of the final code.

However, this conventional technique produces a very large code which may reduce the efficiency of the execution. Indeed, the fact of generating a very large code, with no opportunity for cache memory plane retention in a high-performance processor, imposes a heavy use of the slow memory plane, thereby reducing the efficiency of the performance of this type of strongly linear software. Furthermore, the execution of a strongly linear code on a first core of the processor saturates the bandwidth offered by the slow memory plane. The execution of another similar code by a second core is therefore inefficient since the two cores slow each other down. It will also be noted that the high dependence on the slow memory plane may cause interference between the different cores.

Furthermore, the concatenation of the symbols results in many memory access sequences. The accesses may thus be combined, interchanged or rejected, thereby complicating the timing or the characterization of the complete access sequence. In particular, the performance of modern processors is very sensitive to the memory access type, the lack of characterization of these accesses therefore resulting in a very great difficulty in determining with certainty the "worst case execution time" (WCET), which may be highly detrimental in a "control" or "command" application context.

Furthermore, the conventional technique for on-board code production requires a very large number of accesses in the case of one-by-one (Fetch) data processing. The execution time of an application is therefore largely made up of the time required to load the code onto the processor. This is an effect caused by the absence of major contributors from the execution time in the produced code.

Current techniques for the generation of on-board codes are therefore counterproductive to the contemporary development of processors. This results in a substantially suboptimal utilization of these processors.

An object of the present disclosure is consequently to overcome the aforementioned disadvantages by proposing a method and a system for generating an on-board code suitable for gaining maximum benefit from the intrinsic power of new processors.

SUMMARY

The present disclosure aims to generate automatically a compact application code suitable for benefiting from the intrinsic power of processors. The disclosure herein relates to a method and a system for generating an application code executable by a processor from a formal specification associated with an application, the formal specification including operators, the system comprising an analyzer configured to code each operator of the formal specification by a corresponding operation code followed by a minimum number of input code(s) and output code identifying input and output parameters associated with the operator, thus automatically generating a compact application code suitable for being stored in a memory associated with the processor and for being executed by an interpreter stored in a memory of the processor.

This allows for effective transformation of the formal specification into a formal application code which is very compact in terms of size and which may be loaded onto the processor in a greatly reduced time, while being perfectly understandable by the interpreter associated with the processor. Thus, by using a compact representation of the formal application code, the present disclosure reduces the workload imposed on the memory resource for the purpose of obtaining an improved execution time for applications which have a certain profile, and particularly for multi-core systems where the memory resource is limited and the number of cores tends to be excessive. Furthermore, due to the fact that the accesses are less numerous and are controlled by the fixed-code interpreter, it is easier to predict the sequence and the chronology of the accesses to the memory. The "worst case execution time" of the application software is thus determined with a very high accuracy. The use of high-performance processors integrating a plurality of digital cores is thus substantially optimized.

The analyzer is advantageously configured to define as implicit at least one of the input and output parameters of each symbol belonging to a subset of specific symbols. This allows the application code to be further compressed.

The application code is advantageously a code in which each operation code and/or each of the input code(s) and output code is/are represented by a predetermined bit field.

This enables the correct formatting of the application code, optimization of its structure, reduction in its size and simplification of its production.

By way of example, the application code may be an octal code in which each operation code and/or each of the input code(s) and output code is/are represented by one byte or a multiple of bytes.

Equally, by way of example, the formal specification may be a formal graphical representation.

The system advantageously comprises an interpreter configured to be stored entirely or at least partially in the first-level cache memory of the processor, the interpreter being suitable for decoding and executing the instructions of the application code as they are read. This takes advantage of the cache memories by housing the interpreter there in a first-level cache memory of the processor.

The interpreter is advantageously configured to read each current operation code in order to infer the number and type of parameters, to find pointers associated with the parameters, to determine implicit specifications and to execute the current operation code.

The interpreter thus quickly, efficiently and continuously decodes the application code as a simple configuration table.

The interpreter is advantageously configured to feed itself by anticipating the phase of the elements of the application code stored in an internal or external memory. This allows these access times to be hidden with an additional gain in efficiency.

The disclosure herein also relates to an avionic computer comprising a processor integrating an interpreter and an application code generated by the system according to any one of the preceding characteristics.

The computer thus offers a greater integration into the aircraft and/or a greater capacity for accommodating avionic functions requiring greater processing power, thus further improving aircraft performance.

The disclosure herein also relates to an aircraft comprising at least one avionic computer according to the characteristics above.

The disclosure herein also relates to a method for generating an application code executable by a processor from a formal specification associated with an application, the formal specification including operators, the method comprising:

automatically generating a compact application code by coding each operator of the formal specification by a corresponding operation code followed by a minimum number of input code(s) and/or output code identifying input and output parameters associated with the operator;

storing the application code in a memory associated with a processor; and executing the application code by an interpreter stored in a memory of the processor.

BRIEF DESCRIPTION OF THE DRAWINGS

Other characteristics and advantages of the system and the method according to the disclosure herein will become clearer from a reading of the description given below, in an indicative but non-limiting manner, with reference to the attached drawings in which.

DETAILED DESCRIPTION

The principle of the disclosure herein comprises or consists in using a specific technique for code compression and cache memory management in order to take advantage of the intrinsic power of current processors.

Figure 1:
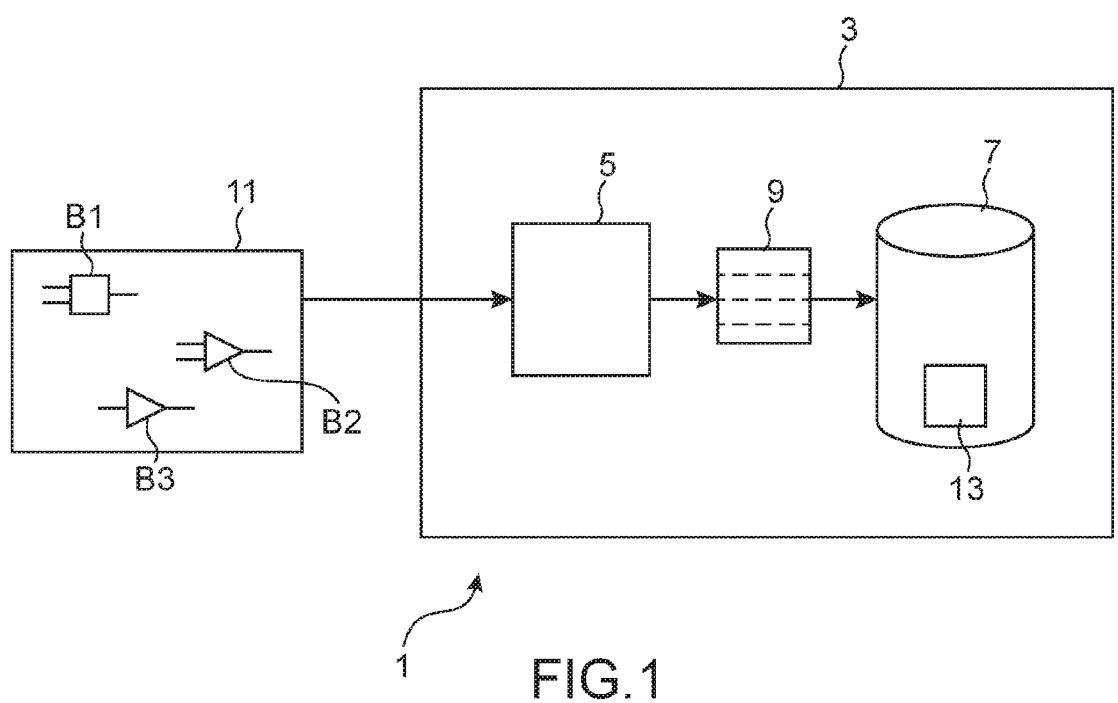
FIG. 1 shows schematically a system for generating an application code, according to one embodiment of the disclosure herein.

FIG. 1 shows schematically a system for generating an application code, according to one embodiment of the disclosure herein.

The code generation system 1 comprises a processing unit 3 including an analyzer 5 and storage units 7.

The analyzer 5 is configured to generate a formal application code 9 (i.e. precise and without any ambiguity) executable by a processor from a formal specification 11 associated with an application. The formal specification 11 specifies the application by sequences of a restricted number of elementary functions comprising arithmetic and/or logical operators (or symbols) B1-B3. By way of example, the formal specification 11 may be in analytical, graphical or other form.

More particularly, the analyzer 5 is configured to code automatically each operator (or symbol) of the formal specification 11 by a corresponding operation code (referred to as an opcode), possibly followed by a minimum number (which may be zero) of input code(s) (i.e. operand codes) and output code identifying input and output parameters or arguments associated with the operator. The automatic coding of all the operators referred to in the formal specification 11 generates a compact application code 9. The latter is suitable for being stored in a memory associated with the processor (or microprocessor) and for being executed by an interpreter stored in a memory of the processor. In particular, an operator (or symbol) may not comprise an input code (or output code), while being provided to acquire a value from a sensor, to read a digital bus, etc. (or to control an actuator, to write to a digital bus, etc.) corresponding implicitly (by definition) to this operator.

It should be noted that there is some information which can be implicitly specified. In particular, for some symbols, the number of associated parameters and the type of parameter (number of integers, number of floats, etc.) can be inferred. In fact, among the set of all of the symbols, a subset exists including specific symbols, at least some of the parameters of which may be assumed to be implicit since no ambiguity exists. This subset comprises short symbols such as NOT, EXPONENT, ABSOLUTE VALUE, etc., as well as logical symbols. For example, the NOT symbol comprises an operation code (i.e. the negation operation), an input code and an output code. However, the input and output parameters may be assumed (without any ambiguity) to be implicit, thus reducing the size of the coding. Furthermore, the logical symbols may also be assumed to comprise implicit parameters when the return value of each logical symbol is retained in a dedicated register of the processor.

The analyzer 5 is thus advantageously configured to define as implicit at least one of the input and output parameters of each symbol belonging to the subset of specific symbols.

The present disclosure thus optimizes the compression rate while enabling an effective coding suitable for being applied to the specific case of multicore, fast processors.

Furthermore, the generated application code 9 is a code in which each operation code and/or each of the input code(s) and output code is/are advantageously represented by a predetermined bit field selected in such a way as to optimize the structure of the application code. By way of example, the application code 9 may be an octal code (referred to as a bytecode). Each operation code and/or each of the input code(s) and output code is/are represented by one byte or a multiple of bytes (n bytes).

It should be noted that the compact application code 9 generated by the analyzer 5 and the associated interpreter 13 are first stored in the storage 7 of the generation system 1 before they are installed in processors. In particular, the interpreter 13 is a very compact software controller (i.e. a computer program) which contains the meaning of each of the symbols of the formal graphical representation. Thus, when the interpreter is loaded onto a processor, it allows the latter to execute the application code.

Figure 2:
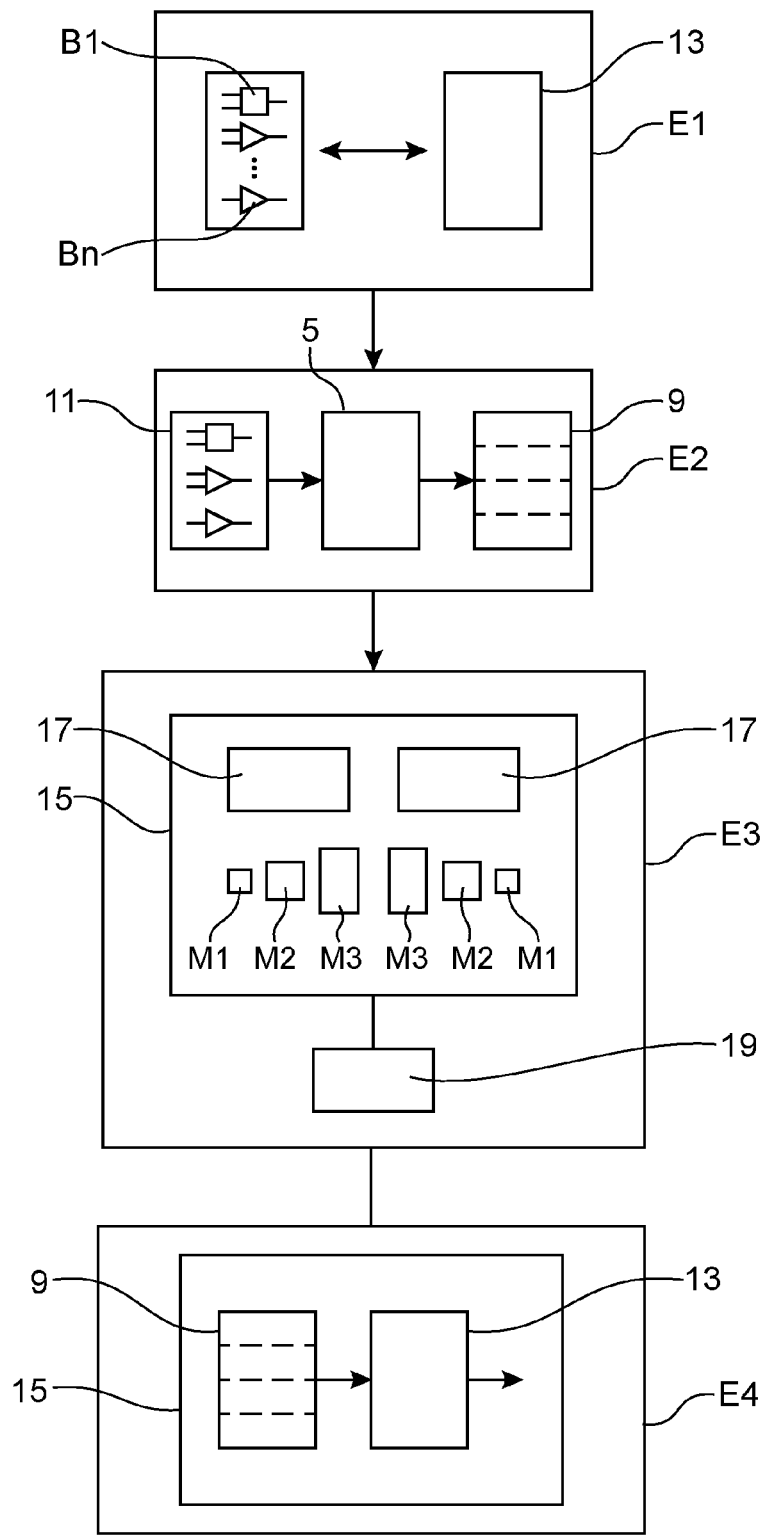
FIG. 2 shows schematically a method for generating an application code intended to be installed in a processor, according to one embodiment of the disclosure herein.

FIG. 2 shows schematically a method for generating an application code intended to be installed in a processor, according to one embodiment of the disclosure herein Step E1 relates to an interpretation computer program which contains the meaning of each of the operators or symbols B1-Bn which can be used by the formal specification. This interpretation program thus corresponds to the software controller of the interpreter 13 that will be used to interpret the application code 9.

It should be noted that the formal specification comprises a much-reduced number of operators B1-Bn, thus enabling the construction of a very compact interpreter, thus allowing its execution in an ultra-fast memory plane of the processor. By way of example, the formal specification may be defined according to a graphical representation constructed from a SCADE environment which comprises a reduced number of symbols. More particularly, when the application code 9 is represented by an octal code (bytecode), a limit of 256 symbols will apply. Obviously, when the application code 9 is represented by a bit field, the only limit is the size of the internal memories of the processor.

The interpreter 13 will be used continuously in order to read and execute the application code 9 at an extreme speed compared with the prior art. In fact, instead of generating a code for each of the functions (as in the prior art), the present disclosure produces only a few coded words and it is the interpreter 13 stored in the fast memory/memories which contains the meaning of each of the symbols.

Step E2 relates to the construction by the analyzer 5 of the formal application code 9 from the formal specification 11. By way of example, when the formal specification corresponds to a graphical representation, it may be made up of a plurality of boards, each including a circuit of symbols.

Figure 3:
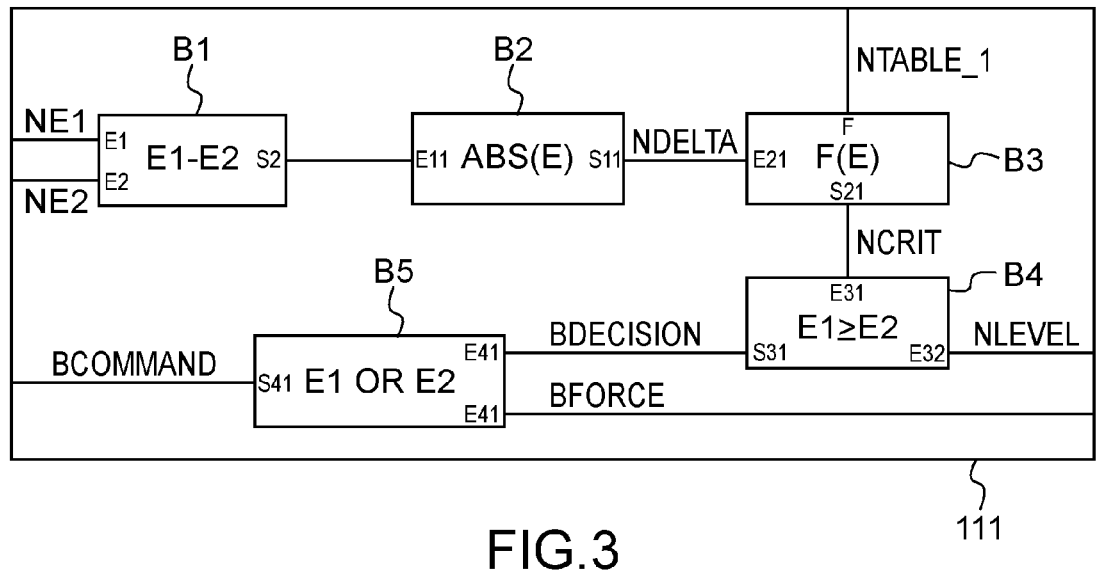
FIG. 3 shows an example of a board and a part of the formal specification of an application, according to the disclosure herein.

In fact, FIG. 3 shows an example of a board of a part of the formal specification of an application, according to the disclosure herein.

This board 111 describes a block diagram of mathematical and logical operations including five blocks or operators B1-B5. The first block B1 symbolizes a subtraction operation between two numerical inputs NE1 and NE2, the second block B2 symbolizes an absolute value operation, the third block B3 represents an interpolation operation, the fourth block B4 represents a comparison operation and, finally, the fifth block B5 represents a logical "OR" operation.

This branch 111 thus shows that the two numerical inputs NE1 and NE2 are first subtracted (NE1−NE2) in the first block B1. The absolute value of the result of the subtraction NDIFF is calculated by block B2 which delivers the result NDELTA at its output. The absolute value NDELTA is interpolated by block B3 on the basis of a pre-calculated interpolation table NTABLE_1 and the numerical value of the result NCRIT is delivered at the output of block B3. Block B4 then compares the numerical value NCRIT with a predetermined threshold NLEVEL. Finally, block B5 performs an OR operation between the Boolean resulting from the comparison at the output of block B4 and a Boolean input BFORCE and then generates the output BCOMMAND of the board.

According to the disclosure herein, the graphical representation of the board 111 will be automatically transformed by the analyzer 5 into a corresponding application code 9 by coding each of the symbols B1-B5 by a corresponding operation code followed by a predetermined number of parameter codes (i.e. input/output codes). It is then assumed that the application code is an octal code (or bytecode) in which each operation code and each parameter code are represented by a one-byte word, obviously knowing, as previously described, that each word may be represented by a different number of bits.

More particularly, the analyzer 5 is configured to generate the format of words associated with each symbol by minimizing as far as possible the arguments or parameters of the symbols by assuming some parameters to be implicit when no ambiguity exists. The analyzer 5 is also configured to define a concatenation logic for words associated with each symbol. Each instruction begins with the operation code which determines the type of the instruction, possibly followed by a variable number of words which each identify an explicit input or output parameter.

For example, the first operator or symbol B1 representing a subtraction operation comprises two inputs E1 and E2 and one output $S1=E1-E2$. The analyzer thus transforms the first operator B1 into four bytes made up of one byte for the subtraction operation code followed successively by three bytes to identify the input parameters or operands E1, E2 and the output parameter S1. This is then expressed successively by DIFF NE1 NE2 NDIFF which is translated into 01H 01H 02H 03H with the subtraction operation coded by 01H, the first input NE1 by 01H, the second input NE2 by 02H, and the output NDIFF by 03H.

The second operator or symbol B2 representing the absolute value comprises an input E11 and an output $S11=ABS(S1)$ which normally correspond to three bytes (the operation, the input and the output). However, the input and the output are advantageously assumed to be implicit parameters and consequently the second operator B2 is encoded without any ambiguity in a single byte, thereby reducing the size of the code and the number of arguments to be translated.

The third operator or symbol B3 representing an interpolation operation comprises two inputs E21 and F1 and one output $S21=F(F1, E21)$. However, the input F1 corresponds to a pointer which points in a determined manner to the variables of a previously calculated table and it is not therefore necessary to code it in an explicit manner. It should be noted that any parameter that is used only once in the specification (for example F1) may be stored according to the order of use and consequently it is not necessary to specify this type of parameter explicitly. The third operator B3 is then coded by only three bytes (instead of four) made up of one byte defining the operation followed by one byte defining the input E21 and another byte defining the output S21. In one particular case in which the input E21 is implicit (since it corresponds to the output of the preceding operator B2) and the output S21 is implicit (since it corresponds to the input of the following operator B4), the operator B3 can then be coded on a single byte.

The fourth operator or symbol B4 representing a comparison operation comprises two inputs E31 and E32 and one output $S31=E31\ E32$. In this case, the analyzer transforms this fourth operator B4 into four bytes made up of one byte for the inequality operation code followed successively by three bytes to identify the input parameters E31, E32 and the output parameter S31.

Finally, the fifth operator or symbol B5 representing a logical "OR" operation comprises two inputs E41 and E42 and one output S41=E41 OR E42. In this case, the analyzer transforms this fifth operator B5 into four bytes made up of one byte for the OR operation code followed successively by three bytes to identify the input parameters E41, E42 and the output parameter S41. It may possibly be assumed that the last Boolean datum produced (i.e. the result of the comparison) is an implicit output of the OR operation code. In this case, a specific code is used for this operator in order to specify that its output is implicit.

The analyzer thus takes as input the graphical representation of the board and automatically produces as output a corresponding application code with a particular format in the following manner:

Operation codes
SUB=01h
ABS=02h
F=03h
COMPARE 04h
OR=05h
Boolean variable codes
BDECISION=01h
BFORCE=02h
BCOMMAND=03h
Double-precision floating variable codes.
NE1=01h
NE2=02h
NDIFF=03h
NDELTA=04h
NCRIT=05h
NLEVEL=06h
Generated bytecode.
NDIFF:=NE1−NE2
01h 01h 02h 03h
NDELTA:=ABS(NDIFF)
02h 03h 04h
NCRIT:=F(NTABLE_1, NDELTA)
03h 04h 05h
BDECISION:=NCRIT>=NLEVEL
04h 05h 06h 01h
BCOMMAND:=BDECISION OR BFORCE
05h 01h 02h 03h This code above comprises 18 bytes, which can be further reduced (for example to only 10 bytes) by using implicit parameter passing and by defining new operation codes:
*:=NE1−NE2
11h 01h 02h
*:=ABS(*)
22h
*:=F(NTABLE_1,*)
23h
*:=*>=NLEVEL
24h 06h
BCOMMAND:=* OR BFORCE
35h 02h 03h This produces a gain close to "2", not only in the time required to load the code from the memory but also in the parameter decoding time.

In step E3 (FIG. 2), the interpreter 13 and the application code 9 specific to the application are installed in a processor 15.

The processor 15 generally comprises a plurality of digital cores 17 which can operate simultaneously in an autonomous manner, and also a plurality of internal memories M1, M2, M3 generally used as cache memories in order to maximize the use thereof (i.e. the same memory cell can be used consecutively for a different data during the processing operations where they are most frequently used).

Figure 4:
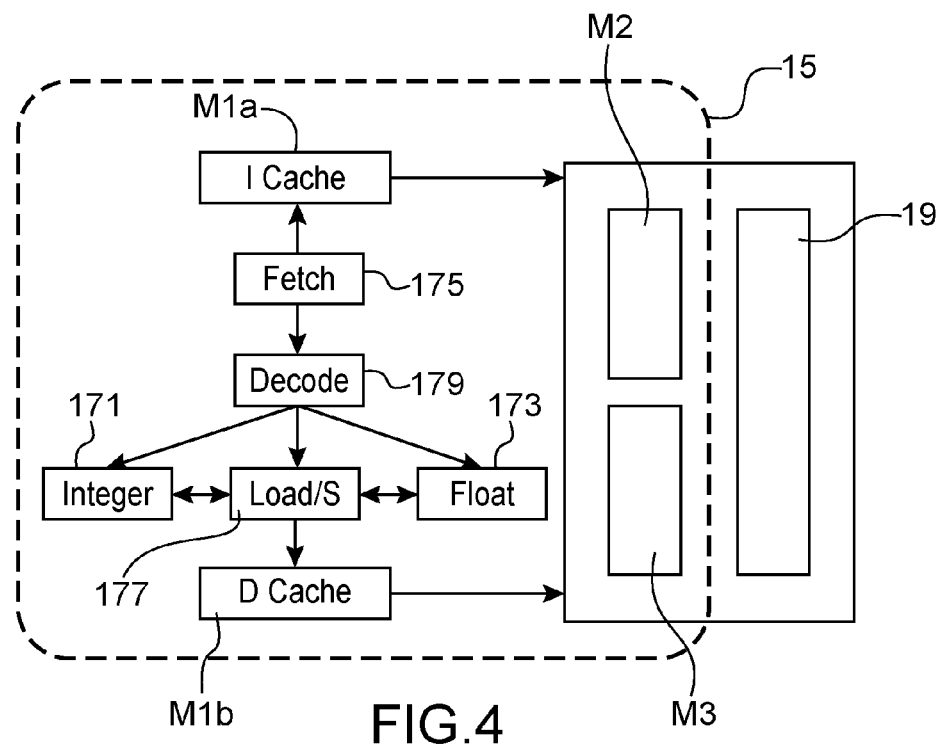
FIG. 4 shows schematically a functional part of a processor, according to the disclosure herein.

FIG. 4 shows schematically a functional part of a digital core of a processor, according to the disclosure herein.

Each digital core 17 comprises execution units 171-179 intended to perform calculations on integral numbers 171 and real (or floating) numbers 173, to access 175 internal memories M1-M3 for the specific instructions of the processor, to access 177 internal memories M1-M3 for data, to perform instruction decoding operations 179, to take branching decisions, etc. The cache memories M1-M3 are organized on a plurality of levels from the fastest but smallest to the slowest but largest. The caches are often dimensioned to serve a plurality of cores effectively at the same time, in particular all of cores at the same time.

By way of example, the cache memories M1-M3 may be organized on three levels. The cache memory M1 on the first level (referred to as L1) is ultra-fast but small (for example in the region of 32 kbytes of code and 32 kbytes of data). The cache memory 2 on the second level (referred to as L2) is slower but larger (for example in the region of 256 kbytes). The cache memory M3 on the third level (referred to as L3) is the slowest but the largest. The cache memories speed up the execution of a program. The processor 15 also has a very large main memory plane 19 offering Double Data Rate (DDR) access but with accesses which are slower than all the levels of the cache memories M1, M2 and M3.

Thus, in order to benefit from the speed of the cache memories M1-M3, the interpreter 13 is loaded as a priority into a fast memory, followed by the data (constants and variables). In fact, the part of the cache memory M1 on the first level LI dedicated to the instructions M1a is used extensively to house the interpreter 13 which is very compact, thus making this possible. The part of the cache memory M1 b dedicated to the temporary data is used to store the register stacks and the variables, knowing that the management in the form of stacks authorized by the solution of the present disclosure allows this type of very high-performance use. If the size of the cache memory M1 were to be insufficient, some of the register stacks and variables could be stored in the cache memory M2 on the second level L2.

The application code 9, being very compact, can be loaded into a slower memory (for example into the DDR main memory) insofar as it is possible to anticipate its loading into a fast memory before it is required.

Finally, the cache memories on the highest level (for example L3) which are normally shared, should preferably be used for the exchanges between the cores and the outside.

In step E4 (FIG. 2), the application code 9 is executed by the processor 15. In particular, the application code 9 becomes like a simple configuration table decoded continuously by the on-board processor 15.

In particular, the interpreter 13 reads the current code associated with an intended symbol, it infers from it the number and type of parameters to be read, it finds the pointers associated with the parameters in the input/output codes of the parameters, and it executes the code associated with the intended symbol. It should be noted that the data will be consumed in the same order as the execution of the symbols, hence the fact that some parameters may be implicit (i.e. retained). There is therefore no need to provide information to know which symbol will use which retained element.

The interpreter 13 is advantageously configured to feed itself by anticipating the phase (referred to as prefetch) of the elements of the application code 9 stored in an internal or external memory. In fact, the interpreter 13 may read in advance the application code 9 from the internal memory M2 or M3 or possibly from the external memory 19. This reading anticipation allows the application code access times to be hidden, with an additional efficiency gain.

The interpreter 13 and the generated application code 9 may advantageously be integrated into an avionic computer, in particular for application functions such as control, servo control and operational logic. This enables the effective use of more cores, which is not possible in the prior art where the needs of each core significantly saturate the memory.

Another evident consequence will be a greater integration of the avionic computers and/or a greater capacity to house avionic functions requiring higher CPU performance. Obviously, the interpreter and the application code may also be integrated into other types of devices which may be installed in satellites, trains or other vehicles, boats, etc.

Furthermore, it should be noted that the system and method of the present disclosure allow the size of the executable code to be divided by a factor of around 10 compared with the prior art, thus improving, in particular, the start-up time in most digital cores and simplifying the use of some digital cores (for example the automotive range).

Furthermore, the reduction in the utilization ratio of the main memory plane to the benefit of a greater use of the ultra-fast cache memory planes ultimately manifests itself in a much greater efficiency of use of the digital cores of the processors. The gains made depend, inter alia, on the size of the elementary symbols.

Furthermore, the reduction in the utilization ratio of the main memory plane and a better temporal characterization of the memory accesses makes it conceivable to use a plurality of digital cores in parallel on a multi-core "System on a Chip" (SoC). The use of a plurality of digital cores allows a multiplication of the performance offered by the multi-core SoC. Furthermore, the better characterization of the behavior (in terms of memory access) of the application code is a highly favorable factor in determining the application software worst case execution time.

Furthermore, the present disclosure does not use conventional compilers and allows a greater control of the behavior of the application code, which is a favorable factor for certification.

It should also be noted that the control of the instructions according to the disclosure herein allows the application of any rule contributing to an equitable and optimal use of bus resources and processor memories.

Finally, the system and method of the present disclosure apply to both single-core and multi-core processors, and also to processors which use fast internal memory planes.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for generating an application code executable by a processor from a formal specification associated with an application, the formal specification including operators, the system comprising:
an analyzer configured to generate automatically a compact application code by coding each operator of the formal specification by a corresponding operation code followed by zero or more input code(s) and output code identifying input and output parameters associated with the operator, the compact application code being configured for storage in a first memory associated with the processor and for being executed by an interpreter containing a processor readable translation of each of the operators;
wherein the interpreter is configured to be stored entirely in a first-level cache memory of the processor.

2. The system as claimed in claim 1, wherein the analyzer is configured to define as implicit at least one of the input and output parameters of each symbol belonging to a subset of specific symbols.

3. The system as claimed in claim 2, wherein the application code is a code in which each operation code and/or each of the input code(s) and output code is/are represented by a predetermined bit field.

4. The system as claimed in claim 1, wherein the application code is a code in which each operation code and/or each of the input code(s) and output code is/are represented by a predetermined bit field.

5. The system as claimed in claim 1, wherein the application code is an octal code in which each operation code and/or each of the input code(s) and output code is/are represented by one byte or a multiple of bytes.

6. The system as claimed in claim 1, wherein the formal specification is a formal graphical representation.

7. The system as claimed in claim 1, wherein the interpreter is configured for decoding and executing instructions of the application code as they are read.

8. The system as claimed in claim 7, wherein the interpreter is configured to read each current operation code in order to infer a number and type of parameters, to find pointers associated with the parameters, to determine implicit specifications and to execute the current operation code.

9. The system as claimed in claim 8, wherein the interpreter is configured to anticipate a phase of or prefetch the elements of the application code stored in an internal or external memory.

10. The system as claimed in claim 7, wherein the interpreter is configured to anticipate a phase of or prefetch the elements of the application code stored in an internal or external memory.

11. An avionic computer comprising a processor integrating an interpreter and an application code generated by a system for generating an application code executable by a processor from a formal specification associated with an application, the formal specification including operators, the system comprising:
- an analyzer configured to generate automatically a compact application code by coding each operator of the formal specification by a corresponding operation code followed zero or more input code(s) and output code identifying input and output parameters associated with the operator, the compact application code being configured for storage in a first memory associated with the processor and for being executed by an interpreter containing a processor readable translation of functions associated with each of the operators;
- wherein the interpreter is configured to be stored entirely in a first-level cache memory of the processor.

12. A method for generating an application code executable by a processor from a formal specification associated with an application, the formal specification including operators, the method comprising:
- automatically generating a compact application code by coding each operator of the formal specification by a corresponding operation code followed by zero or more input code and/or output code identifying input and output parameters associated with the operator;
- storing the application code in a first memory associated with a processor; and
- executing the application code by an interpreter containing a meaning processor readable translation of functions associated with each of the operators;
- wherein the interpreter is configured to be stored entirely in a first-level cache memory of the processor.

* * * * *